United States Patent [19]
McSpadden et al.

[11] Patent Number: 6,087,954
[45] Date of Patent: Jul. 11, 2000

[54] SYSTEM FOR ENABLING HANDICAPPED INDIVIDUALS TO USE GASOLINE DISPENSERS

[75] Inventors: John Steven McSpadden; David Lee Kaehler; Timothy Earle Dickson, all of Greensboro, N.C.

[73] Assignee: Marconi Commerce Systems Inc., Greensboro, N.C.

[21] Appl. No.: 09/025,095

[22] Filed: Feb. 17, 1998

[51] Int. Cl.⁷ ...................................................... H04Q 5/22
[52] U.S. Cl. ................................ 340/825.19; 340/825.34; 340/825.35; 340/825.31; 340/10.41; 141/94; 141/98; 705/413; 345/329
[58] Field of Search ........................... 340/825.54, 825.19, 340/825.34, 825.35, 10.1, 10.41; 141/94, 98; 705/413; 345/329

[56] References Cited

U.S. PATENT DOCUMENTS

| | | |
|---|---|---|
| 3,749,283 | 7/1973 | Nelson . |
| 4,199,100 | 4/1980 | Wostl et al. . |
| 4,395,627 | 7/1983 | Barker et al. . |
| 4,410,949 | 10/1983 | Huellinghurst et al. . |
| 5,383,500 | 1/1995 | Dwab et al. . |
| 5,459,304 | 10/1995 | Eisenmann . |
| 5,459,306 | 10/1995 | Stein et al. . |
| 5,482,139 | 1/1996 | Rivalto . |
| 5,612,527 | 3/1997 | Ovadia . |
| 5,734,851 | 3/1998 | Leatherman et al. ................... 345/329 |
| 5,890,520 | 4/1999 | Johnson, Jr. ............................ 705/413 |
| 5,923,572 | 7/1999 | Pollock ............................. 340/825.34 |

OTHER PUBLICATIONS

Micron Communications, Inc., presentation to Texaco dated Mar. 25, 1997.
Shell E–Z Pay System brochure dated Feb. 18, 1997.

*Primary Examiner*—Brian Zimmerman
*Assistant Examiner*—Yves DaLencourt
*Attorney, Agent, or Firm*—Coats & Bennett, P.L.L.C.

[57] ABSTRACT

A system for assisting handicapped individuals in operating gasoline dispensers which includes a transponder in which data is stored according to the specific gasoline requirements of the individual. A transceiver is located proximate the gasoline dispenser and interrogates the transponder to obtain such stored data, and generates a signal which is a function of the stored data that is transmitted to a computer which receives the signal and generates predetermined control signals for operating the gasoline dispenser. The system may also include a warning signal device activated by the transponder to notify an attendant that the handicapped individual is approaching and this device may include a read-out device which displays predetermined personal information relating to the handicapped individual.

24 Claims, 1 Drawing Sheet

SYSTEM FOR ENABLING HANDICAPPED INDIVIDUALS TO USE GASOLINE DISPENSERS

BACKGROUND OF THE INVENTION

This invention relates generally to a system for providing preprogrammed access to a gasoline dispenser and, more particularly, to a system of this sort which enables handicapped individuals to access gasoline dispensers that would otherwise be impossible or difficult to access.

Gasoline dispensers dispense large quantities of gasoline, which is volatile and potentially very harmful if not properly handled and, as a result, a number of safety measures must be taken in connection with the dispensers to ensure that customers who dispense gasoline using the dispensers are fully protected.

For example, it is required that gasoline dispensers be protected from being struck by automobiles approaching the dispensers for fueling, and the gasoline dispensers are therefore generally surrounded by barriers spaced therefrom and/or they are mounted on raised islands or the like.

While these safety measures are necessary for the protection of normal users of the gasoline dispensers, they inherently create a significant barrier to many handicapped individuals that make access thereto physically inaccessible or difficult to access by such individuals. For example, the aforesaid barrier associated with gasoline dispensers can make it physically impossible for a handicapped individual who is in a wheelchair to reach the control panel of the gasoline dispenser and press the necessary control buttons to obtain the particular gasoline (e.g., octane rating) and method of payment (e.g., credit card) needed by a particular individual. Other forms of disability make it difficult or impossible to operate the fueling nozzle, read displayed instructions or values on the display screen of the gasoline dispenser or hear the voice of the attendant over an intercom.

Another type of handicap that an individual could have is color blindness. It may be difficult for a color blind individual to read a color LCD or CRT screen located on the dispenser, depending on the color schemes shown. Fuel dispensers are also becoming increasingly more advanced with the addition of color LCD or CRT screens on the dispenser. These screens provide interaction and directions to the individual and can also provide information not related to the fueling process. A color blind individual may not be able to distinguish variations of color on the screen depending on the colors shown and the individual's particular type of color blindness handicap.

While the American Disabilities Act (ADA) is generally designed to remove or lessen the number of barriers to which handicapped individuals are subjected, implementation of the remedial aspects of the ADA has been inhibited or delayed because of the aforesaid competing public policy that users of gasoline dispensers must be protected by appropriate barriers and the like. This dichotomy of conflicting interests have resulted in the lack of a satisfactory solution to the problem of providing convenient access to gasoline dispensers by handicapped individuals.

In U.S. Patent No. 5,072,380 to Randelman et al, a system is disclosed which utilizes a transponder mounted on a vehicle to communicate between a vehicle and a computer system at a service station, and which permits the transfer of certain information between the customer and the service station at which the system is used. However, this system does not contemplate or suggest any method of utilizing specific information associated with a handicapped individual to permit ready access to a gasoline pump by such handicapped individual.

SUMMARY OF THE INVENTION

Briefly summarized, the present invention includes an apparatus and method for enabling physically handicapped individuals to access and operate a gasoline dispenser that would otherwise be physically inaccessible or difficult to access by such handicapped individual. The system includes a transponder which is located proximate the physically handicapped person, and on which is stored data that is related to the specific gasoline requirements of a vehicle associated with the handicapped person. A transceiver is located proximate a gasoline dispenser for interrogating the transponder to obtain therefrom the data stored in the transponder when the transponder comes within a predetermined distance of the transceiver, and the transceiver generates signals which are a function of the stored data received from the transponder. A computer is provided for receiving the aforesaid signals from the transceiver, and for generating predetermined control signals for operating a gasoline dispenser in accordance with the aforesaid specific gasoline and/or assistance requirements of the handicapped individual.

BRIEF DESCRIPTION OF THE DRAWING

The drawing is a block diagram schematic of the method and apparatus of the present invention.

DESCRIPTION OF THE PREFERRED EMBODIMENT

Figure 1:
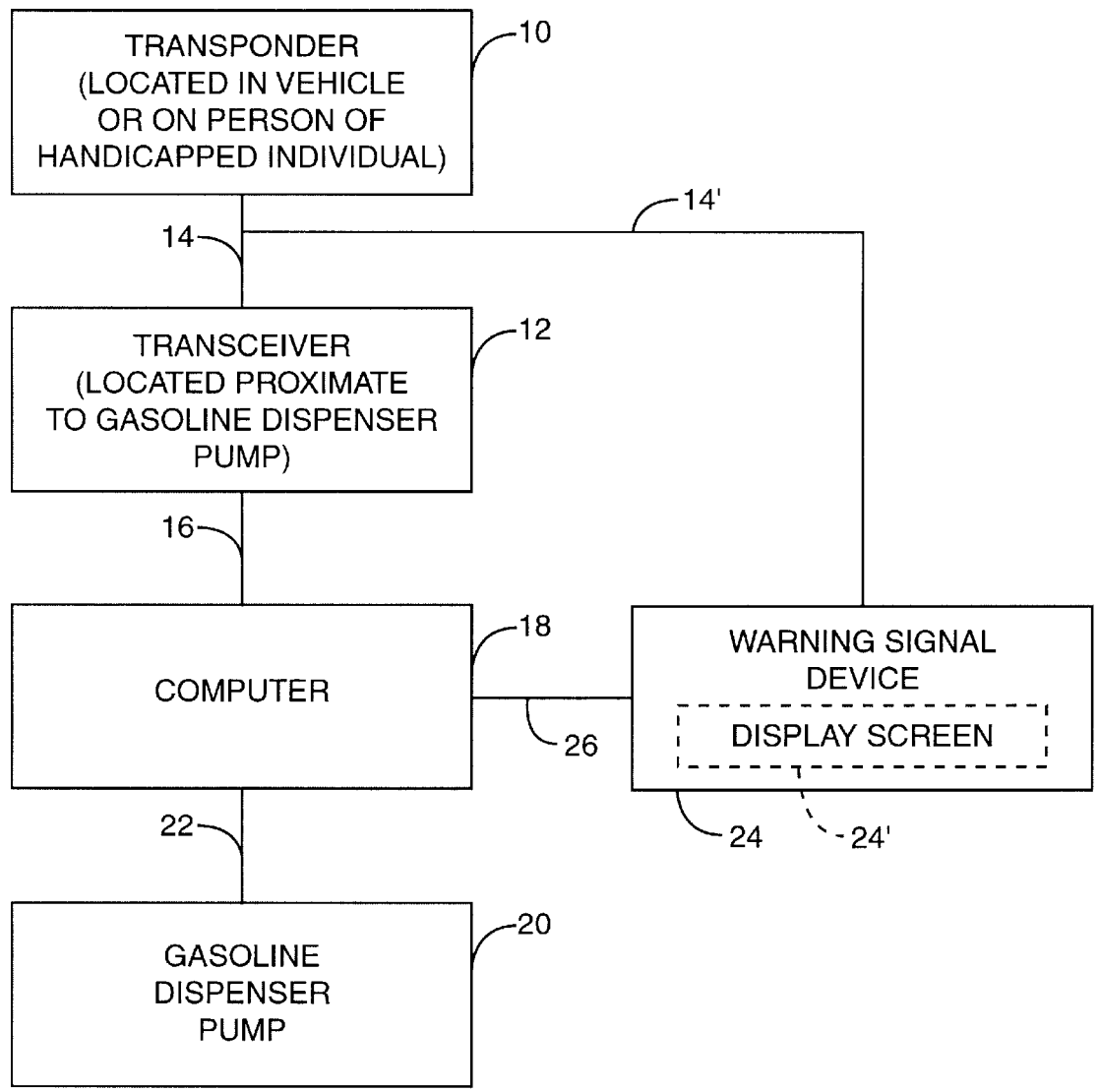

Looking now in greater detail at the accompanying drawing, the present invention includes a conventional transponder or remote communication device represented by block 10 in the drawing, and this transponder would be located proximate a disabled individual in a vehicle (not shown). The transponder 10 could be mounted in the vehicle itself, or it could be carried on or about the person of the disabled individual. For example, the transponder could be mounted on an individual's wheel chair or blind guide stick. The remote communication device could also be carried in an individual's wallet or purse. As is well-known in the art, the conventional transponder 10 may be active or passive and it can be made to include stored data relating to the specific requirements of the handicapped individual and/or the specific gasoline requirements of such individual, including, for example, the type of assistance required by the individual, payment options, fueling limitations, receipt specifications, personal identification codes, an indication that the individual is color blind, and other information normally obtained by customer interaction with fueling dispenser.

A conventional transceiver 12 is located proximate a conventional gasoline dispenser 20 (sometimes commonly referred to as a gasoline pump) for interrogating the transponder 10 to obtain the aforesaid stored data therefrom when the transponder 10 comes within a predetermined distance of the transceiver, such interrogation being indicated by the line 14 in the drawing.

The transceiver 12 then generates a signal which is a function of the stored data received from the transponder, this signal being indicated by the line 16 in the drawing, and the signal is transmitted to a CPU or computer 18 which receives the signal 16 from the transceiver 12, and generates predetermined control signals for operating the gasoline dispenser 20. These control signals are indicated by line 22, and they are generated by the computer 18 as a function of the specific signals received from the transponder 10. These signals then control the operation of the gasoline dispenser 20 in accordance with the specific gasoline requirements of the handicapped individual.

Moreover, as is well-known in the art, the conventional transponder or remote communication device 10 may be capable of uni-directional or bi-directional communications with the conventional transceiver 12, and may include a transmitter and a receiver (not shown) capable of separately receiving and transmitting signals, or it may be configured so that the transmitter operates on, or modifies, signals generated by the transceiver 12.

Additionally, a warning signal device 24 may be located proximate the gasoline dispenser 20, and this warning signal device 24 is operable to generate a warning signal, which may be visual or audible, when the transponder 10 comes within a predetermined distance of the gasoline dispenser, the signal from the transponder 10 to the warning signal device 24 being represented by line 14' in the drawing. The warning signal device 24 will be located somewhere near an attendant and the warning signal generated by the warning signal device 24 will alert the attendant that a handicapped individual is approaching the gasoline dispenser 20 in his or her automobile, and that such person will require assistance by the attendant in operating the gasoline dispenser. Preferably, the warning signal device 24 also includes a conventional electronic read-out display device having a screen 24, and the computer 18 will generate a signal 26 which is a function of the specific needs of the particular handicapped individual, as indicated by the stored data, and these specific needs are then displayed on the read-out screen of the warning signal device, whereby the attendant will know exactly what assistance is required for that particular handicapped individual.

Modern gasoline dispensers have conventional LCD or CRT display screens that display information in particular color combinations, and these colors can be changed using conventional electronic control signals. As is well known, some people are color blind and cannot distinguish between certain colors, red and green being the most common, and therefore there is a need for offering to such handicapped individuals the option of changing the color combination presented by the fuel dispenser display screen to one that can be distinguished by that individual.

While it will be understood that the system of the present invention can be designed to utilize a wide variety of different types of information and operating signals for handicapped individuals depending on the complexity and sophistication of the system requirements, a few examples will demonstrate the advantages of the present invention.

In one such example, the transceiver for a severely handicapped individual could be encoded with a set of default parameters that would cause the computer 18 to generate control signals that would operate the gasoline dispenser 20 to include one or more of the following operations that would eliminate some specific manual operational steps that are normally carried out manually by non-handicapped individuals or that would provide assistance to the handicapped individual that is not currently available, including the following:

1. The dispenser could be operated without requiring the handicapped individual to enter his or her payment card data or account number and personal identification number (PIN).
2. The receipt from the gasoline purchase could be produced on an extra long piece of paper so that it would be easier for the handicapped person to reach the receipt without leaving the automobile.
3. The particular grade selection (e.g., octane) normally utilized by the particular handicapped individual would automatically be selected by the gasoline dispenser, thereby relieving the handicapped individual of the burden of reaching out and pressing a switch to indicate such grade selection.
4. The size of the font on the gasoline dispenser which specifies the volume of gasoline dispensed and the cost thereof could be substantially increased so as to be easily seen from a greater distance (e.g., from within the automobile) or more easily seen by a handicapped individual having particularly bad eyesight, and/or the gasoline dispenser could generate audio signals representative of the gasoline dispensed and/or the cost thereof.
5. The color combination presented by the aforesaid LCD or CRT display screen on the fuel dispenser could be changed. For example, if the handicapped individual is red/green color blind, the colors could be changed to a combination that did not display red and green colors at the same time.

In another example, the readout display of the warning signal device 24 could specify the particular infirmities of the handicapped individual, such as, for example, that the individual has muscular dystrophy or some other particular handicap, in which case the attendant will be made aware of the particular needs of the handicapped individual and will be able to assist such individual in an effective manner, while minimizing any embarrassment to the disabled individual. Similarly, the display could indicate whether the handicapped individual has the ability to get in and out of their car without assistance which, again, would indicate to the attendant the specific needs of the handicapped individual.

In yet another example, one particular gasoline dispenser 20 at a service station could be reserved solely for use by handicapped individuals, and this gasoline dispenser 20 would only be activated by the transponder 10 when the transponder 10 comes within a predetermined distance of the gasoline dispenser 20, and this particular gasoline dispenser 20, which could only be accessed by handicapped individuals, could be designed with special features for assisting handicapped individuals operating the gasoline dispenser.

It will be appreciated from the above that the present invention provides a system by which a service station can render its gasoline dispensers much more accessible to handicapped individuals, without sacrificing any safety requirements demanded by the dangers of pumping volatile gasoline and, more importantly, it will, for the first time, give handicapped individuals much needed assistance in operating gasoline dispensers and this assistance may be tailored to meet the needs of each handicapped individual, depending on the specific nature of the handicap of each such individual.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A system for permitting a visually handicapped individuals to access and operate a gasoline dispenser that would otherwise be difficult to access by the visually handicapped individual, said system including:
    (a) a transponder associated with the visually handicapped individual in which is stored data related to the specific requirements of such visually handicapped individual in connection with the operation of said gasoline dispenser;
    (b) a transceiver associated with said gasoline dispenser for interrogating said transponder to obtain said stored data therefrom when said transponder comes within a predetermined distance of said transceiver and for generating signals which are a function of the stored data received from said transponder;
    (c) a computer for receiving said signals from said transceiver and generating predetermined control signals for operating said gasoline dispenser in accordance with said specific requirements of said handicapped individual.

2. The system as defined in claim 1, wherein said predetermined control signals generated by said computer include a signal for causing a font on a display screen included in said gasoline dispenser to be increased to a predetermined size that is more readable by said visually handicapped individual.

3. The system as defined in claim 1, wherein a display screen having changeable color combinations is provided at said gasoline dispenser, and wherein said predetermined control signals generated by said computer include a signal for causing said color combination to be changed to provide a combination that can be readily distinguished by said visually handicapped individual.

4. The system as defined in claim 1, wherein said system includes a warning signal device located proximate said gasoline dispenser, said warning signal being operable to generate a warning signal when transponder comes within a predetermined distance of said gasoline dispenser whereby an attendant can be notified that said visually handicapped individual is approaching said gasoline dispenser and may require assistance.

5. The system as defined in claim 4, wherein said warning signal device includes a read-out device, and wherein said computer generates a second control signal that is transmitted to said read-out device to cause it to display predetermined personal information concerning the needs of said visually handicapped individual.

6. A method of enabling physically handicapped individuals to access and operate a gasoline dispenser that would otherwise be physically inaccessible or difficult to operate by such handicapped individual, said method including the steps of:
    (a) storing data in a transponder corresponding to the specific requirements of such handicapped individual in connection with the operation of said gasoline dispenser;
    (b) locating a transceiver proximate said gasoline dispenser and causing said transceiver to obtain said stored data from said transponder when said transponder comes within a predetermined distance of said transceiver and to generate a signal which is a function of the stored data received from said transponder; and
    (c) operating a computer to receive said signal from said transceiver and to generate predetermined control signals for operating said gasoline dispenser in accordance with said specific requirements of said handicapped individuals.

7. A method as defined in claim 6, wherein said predetermined control signals generated by said computer include a signal for permitting said gasoline dispenser to be operated without requiring the said handicapped individual to enter any payment card date, account number or personal identification number.

8. A method as defined in claim 6, wherein said predetermined control signals generated by said computer include a signal for causing said gasoline dispenser to generate a receipt having a predetermined increased length so that it is easier for said handicapped individual to reach the receipt.

9. A method as defined in claim 6, wherein said predetermined control signals generated by computer include a signal for causing said gasoline dispenser to automatically select an octane grade of gasoline to be dispensed by said gasoline dispenser selected by said handicapped individual.

10. A method as defined in claim 6, wherein said predetermined control signals generated by said computer include a signal for causing the font on the gasoline dispenser to be increased to a predetermined size that is more readable by said handicapped individual.

11. A method as defined in claim 6, wherein said gasoline dispenser is provided with a display screen having changeable color combinations, and wherein said predetermined control signals generated by said computer include a signal for causing said color combination to be changed to provide a combination that can be readily distinguished by said handicapped individual.

12. A method as defined in claim 6, wherein said method includes the step of generating a warning signal proximate said gasoline dispenser when said transponder comes within a predetermined distance of said gasoline dispenser, whereby an attendant can be notified that said handicapped individual is approaching said gasoline dispenser and may require assistance.

13. A method as defined in claim 12 wherein said step of generating a warning signal also includes providing a read-out device and causing said computer to generate a second control signal that is transmitted to said read-out device to cause it to display predetermined personal information concerning the needs of said handicapped individual.

14. A system for permitting physically handicapped individuals to access and operate a gasoline dispenser that would otherwise be physically inaccessible or difficult to operate by such handicapped individual, said system including:
    (a) a transponder located proximate a handicapped individual in which is stored data related to the specific requirements of such handicapped individual in connection with the operation of said gasoline dispenser;
    (b) a transceiver located proximate said gasoline dispenser for interrogating said transponder to obtain said stored data therefrom when said transponder comes within a predetermined distance of said transceiver and for generating signals which are a function of the stored data received from said transponder;
    (c) a computer for receiving said signals from said transceiver and generating predetermined control signals which are a function of said signals generated by said transceiver; and (d) an electronic display means for receiving said signal generated by said computer and displaying textual information on a screen which identified said specific requirements of said handicapped individual.

15. A system for permitting a physically handicapped individual operating a vehicle to obtain fuel from a fuel dispenser that would otherwise be difficult to operate by the physically handicapped individual, said system comprising:

a) a fuel dispenser with a generic mode of operation providing variable features generally available to all customers and a special mode of operation providing variable features available specifically for physically handicapped customers;

b) a transceiver associated with said fuel dispenser and adapted to receive information from a transponder associated with the physically handicapped individual; and c) a computer operatively associated with said fuel dispenser and adapted to change the fuel dispenser from said generic mode of operation to said special mode of operation based on information received from the transponder associated with the physically handicapped individual, and further wherein said variable features of said special mode of operation are specifically varied to accommodate the particular needs of the handicapped individual based on information received from the transponder associated with the physically handicapped individual.

16. The system of claim 15 wherein said fuel dispenser further includes an information display screen adapted to show information related to a fuel dispensing transaction and wherein said variable features of said special mode of operation include variable information display screen characteristics.

17. The system of claim 16 wherein said variable information display screen characteristics include a changeable color scheme that is varied based on information received from the transponder associated with the physically handicapped individual.

18. The system of claim 16 wherein said variable information display screen characteristics include a changeable displayed information size that is varied based on information received from the transponder associated with the physically handicapped individual.

19. The system of claim 15 wherein said fuel dispenser further includes a receipt printer adapted to dispense a printed receipt corresponding to a fueling transaction and wherein said variable features of said special mode of operation include variable printed receipt characteristics.

20. The system of claim 19 wherein said variable printed receipt characteristics include a printed receipt length characteristic that is varied based on information received from the transponder associated with the physically handicapped individual.

21. The system of claim 15 wherein said computer is further adapted to provide a warning signal to alert an attendant that the handicapped individual is proximate said fuel dispenser based on information received from the transponder associated with the handicapped individual.

22. The system of claim 15 further comprising an attendant display operatively associated with said computer and adapted to display specific messages related to the needs of the physically handicapped individual based on information received from the transponder associated with the physically handicapped individual.

23. The system of claim 22 wherein one of said specific messages displayed on said attendant display notifies an attendant that the physically handicapped individual proximate said fuel dispenser is unable to egress their vehicle, and wherein, in response, the attendant operates said fuel dispenser for the handicapped individual.

24. A system for permitting a physically handicapped individual to receive a printed receipt from a gasoline dispenser that would otherwise dispense an inaccessible printed receipt, said system including:

(a) a transponder associated with the physically handicapped individual in which is stored data related to the specific requirements of the physically handicapped individual in connection with the operation of said gasoline dispenser;

(b) a transceiver located proximate said gasoline dispenser for interrogating said transponder to obtain said stored data therefrom when said transponder comes within a predetermined distance of said transceiver and for generating signals which are a function of the stored data received from said transponder;

(c) a computer for receiving said signals from said transceiver and causing said gasoline dispenser to print an extended length receipt accessible by the physically handicapped individual.

* * * * *